United States Patent
Yan

(10) Patent No.: US 9,435,095 B2
(45) Date of Patent: Sep. 6, 2016

(54) PRE-STRESS CORROSION-RESISTANT TUBULAR PILE USED IN SPECIAL COASTAL GEOLOGICAL CONDITIONS AND MANUFACTURING METHOD

(71) Applicant: JIANGSU DONGPU PILE CO., LTD., Jiangsu (CN)

(72) Inventor: Chenghua Yan, Jiangsu (CN)

(73) Assignee: JIANGSU DONGPU PILE. CO., LTD., Lianyungang, Jiangsu (CN)

( * ) Notice: Subject to any disclaimer, the term of this patent is extended or adjusted under 35 U.S.C. 154(b) by 0 days.

(21) Appl. No.: 14/765,207

(22) PCT Filed: Jan. 29, 2014

(86) PCT No.: PCT/CN2014/071791
§ 371 (c)(1),
(2) Date: Jul. 31, 2015

(87) PCT Pub. No.: WO2014/121736
PCT Pub. Date: Aug. 14, 2014

(65) Prior Publication Data
US 2015/0361633 A1    Dec. 17, 2015

(30) Foreign Application Priority Data
Feb. 7, 2013  (CN) .......................... 2013 1 0048550

(51) Int. Cl.
| | | |
|---|---|---|
| *E02D 5/38* | (2006.01) | |
| *B28B 21/62* | (2006.01) | |
| *C04B 28/02* | (2006.01) | |
| *E02D 5/22* | (2006.01) | |
| *E02D 5/42* | (2006.01) | |
| *E02D 5/66* | (2006.01) | |
| *C04B 111/26* | (2006.01) | |
| *C04B 111/56* | (2006.01) | |

(52) U.S. Cl.
CPC ................. *E02D 5/38* (2013.01); *B28B 21/62* (2013.01); *C04B 28/02* (2013.01); *E02D 5/226* (2013.01); *E02D 5/42* (2013.01); *E02D 5/665* (2013.01); *C04B 2111/26* (2013.01); *C04B 2111/56* (2013.01)

(58) Field of Classification Search
CPC .................................. E02D 5/38; C04B 28/02
See application file for complete search history.

(56) References Cited

FOREIGN PATENT DOCUMENTS

| CN | 102179875 | 9/2011 |
|---|---|---|
| CN | 102603233 | 7/2012 |

(Continued)

OTHER PUBLICATIONS

International Search Report filed in PCT/CN2014/071791 mailed May 6, 2014.

*Primary Examiner* — Benjamin Fiorello
*Assistant Examiner* — Kyle Armstrong
(74) *Attorney, Agent, or Firm* — Rankin, Hill & Clark LLP

(57) ABSTRACT

A pre-stress corrosion-resistant tubular pile used in special coastal geological conditions and manufacturing method thereof is disclosed. The raw materials and proportions of the pre-stress corrosion-resistant tubular pile are as follows: 350-450 parts by weight of cement; 90-135 parts by weight of an ore powder; 600-700 parts by weight of sand; 100-120 parts by weight of stones; water and a water reducing agent; wherein the cement and ore powder are gels; the weight ratio of water to the gels is 0.30-0.31, and the mass ratio of the water reducing agent to the gels is (1.8-2.2):100.

9 Claims, 1 Drawing Sheet

(56) References Cited

FOREIGN PATENT DOCUMENTS

| CN | 102633472 | 8/2012 |
| CN | 102718456 | 10/2012 |
| CN | 103086675 | 5/2013 |
| CN | 102718456 B | * 7/2014 |

* cited by examiner

PRE-STRESS CORROSION-RESISTANT TUBULAR PILE USED IN SPECIAL COASTAL GEOLOGICAL CONDITIONS AND MANUFACTURING METHOD

TECHNICAL FIELD

The present invention relates generally to a tubular pile, and specifically to a pre-stress corrosion-resistant tubular pile used in special coastal geological conditions.

BACKGROUND

In a variety of harsh environments, such as in coastal areas, concretes suffer long-term corrosion of salts, causing cracking of the concretes, thereby reducing the durability of the concretes. Among the salts, sulfate and chloride salt play the major role. How to effectively prevent corrosion damage of reinforced concrete in the chloride and sulfate environment, to ensure safe and normal operations during designed service life, and to reduce repair and maintenance costs, has accordingly become an important topic of common concern in today's world.

Therefore, a tubular pile which can resist strong corrosion is needed.

SUMMARY OF THE INVENTION

Objects of the Invention

The purpose of the invention is to develop a tubular pile which can resist strong corrosion, to reduce maintenance costs of the tubular pile.

Technical Solutions

The present invention provides a pre-stress corrosion-resistant tubular pile used in special coastal geological conditions, raw materials and proportions of the pre-stress corrosion-resistant tubular pile are as follows:
- 350-450 parts by weight of cement;
- 90-135 parts by weight of an ore powder;
- 600-700 parts by weight of sand;
- 100-120 parts by weight of stones;
- water and a water reducing agent;

wherein the cement and ore powder are gels; the weight ratio of water to the gels is 0.30-0.31, and the mass ratio of the water reducing agent to the gels is (1.8-2.2):100.

The cement has a grade of 525, a specific surface area of greater than 330 m2/kg, 3-day compressive strength of not less than 32 Mpa, and 28-day compressive strength of not less than 61 Mpa.

The particle size of the stone is 5~25 mm, the mud content of the stone is not more than 1%, and the stone crushing index is less than 8.

Fineness modulus of the sand is 2.6~3.0, and clay content thereof does not exceed 0.9%.

Concrete water reducing rate of the water reducing agent is not less than 25%.

7-day activity index of the ore powder is not less than 95, and 28-day activity index is not less than 105.

As one embodiment, its raw materials and proportions are:
- 135 parts by weight of water;
- 315 parts by weight of cement;
- 135 parts by weight of an ore powder;
- 605 parts by weight of sand; and
- 9.5 parts by weight of a water reducing agent.

The weight ratio of the ore powder to the cement is 3:10.

The present invention further provides a method for producing the above pre-corrosion tubular pipe, comprising the following steps of:

(1) putting the raw materials into a forced mixer according to the proportions, and mixing them for 2~3 minutes to make the slump of the concrete reach 3~5 cm;

(2) putting the mixed concrete into a mold mounted with a reinforcement cage skeleton by a distributing device, and carrying out pre-stress stretch after completion of the distribution, the tensile force is 78%~82% of the total strength of the pre-stress reinforcement;

(3) sealing the mold after four stages of standing, low speed centrifugation, mid-speed centrifugation and high speed centrifugation until the tubular pile molding;

(4) carrying out steam curing twice, with first entering into the conservation pool with the mold with a curing temperature of 85~90 and time of 3.5~4.5 hours and a stripping strength of not less than 55 Mpa; then carrying out demoulding curing by heating to 175~185 to make constant temperature and constant pressure curing with the pressure of 0.9~1 Mpa and curing time of 5.5~6.5 hours; and (5) uniformly reducing the temperature to room temperature after 2~3 hours, and pulling out and hoisting the concrete.

During processes of the centrifugation, rotating speed of the low speed centrifugation is 75~80 r/min and the time thereof is 2~3 minutes, rotating speed of the mid-speed centrifugation is 220~240 r/min and the time thereof is 1~2 minutes, and rotating speed of the high speed centrifugation is 480~550 r/min and the time thereof is 4~6 minutes.

Beneficial Effects

The pre-stress corrosion-resistant tubular pile according to the present invention can be used in coastal and salt lake areas, having strong corrosion resistance and long service life, and significantly reduces maintenance costs.

DETAILED DESCRIPTION OF THE PREFERRED EMBODIMENTS

Figure 1:
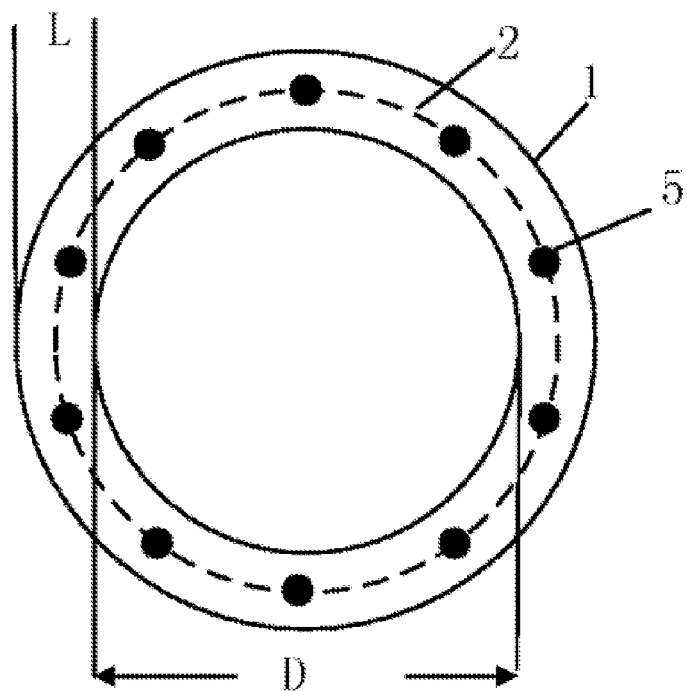
FIG. 1 is a lateral schematic diagram according to embodiments of the present invention.

While the present invention is now further illustrated referring to accompanying drawings and specific embodiments, it should be understood that these embodiments are used only to describe the invention but not to limit the scope of the invention, having benefit of this disclosure, those skilled in the art will appreciate that any equivalent form of modifications to the present invention is fallen in the scope as defined in appended claims of this application.

In Embodiment 1, raw materials of the tubular pile are prepared according to parts by weight as follows: 350 parts of cement; 100 parts of ore powder; 650 parts of sand; 100 parts of stones; wherein the cement and ore powder are gels, the weight ratio of water to the gels is 0.30, and the mass ratio of the water reducing agent to the gels is 1.8:100.

In Embodiment 2, raw materials of the tubular pile are prepared according to parts by weight as follows: 360 parts of cement; 90 parts of ore powder; 700 parts of sand; 105 parts of stones; wherein the cement and ore powder are gels, the weight ratio of water to the gels is 0.30, and the mass ratio of the water reducing agent to the gels is 1.8:100.

In Embodiment 3, raw materials of the tubular pile are prepared according to parts by weight as follows: 380 parts of cement; 110 parts of ore powder; 600 parts of sand; 120 parts of stones; wherein the cement and ore powder are gels, the weight ratio of water to the gels is 0.31, and the mass ratio of the water reducing agent to the gels is 2.0:100.

In Embodiment 4, raw materials of the tubular pile are prepared according to parts by weight as follows: 400 parts of cement; 110 parts of ore powder; 700 parts of sand; 115 parts of stones; wherein the cement and ore powder are gels, the weight ratio of water to the gels is 0.30, and the mass ratio of the water reducing agent to the gels is 2.0:100.

In Embodiment 5, raw materials of the tubular pile are prepared according to parts by weight as follows: 420 parts of cement; 100 parts of ore powder; 600 parts of sand; 114 parts of stones; wherein the cement and ore powder are gels, the weight ratio of water to the gels is 0.305, and the mass ratio of the water reducing agent to the gels is 2.1:100.

In Embodiment 6, raw materials of the tubular pile are prepared according to parts by weight as follows: 450 parts of cement; 90 parts of ore powder; 600 parts of sand; 120 parts of stones; wherein the cement and ore powder are gels, the weight ratio of water to the gels is 0.30, and the mass ratio of the water reducing agent to the gels is 2.2:100.

In Embodiment 7, raw materials of the tubular pile are prepared according to parts by weight as follows: 430 parts of cement; 110 parts of ore powder; 700 parts of sand; 110 parts of stones; wherein the cement and ore powder are gels, the weight ratio of water to the gels is 0.31, and the mass ratio of the water reducing agent to the gels is 1.9:100.

In Embodiment 8, raw materials of the tubular pile are prepared according to parts by weight as follows: 350 parts of cement; 100 parts of ore powder; 650 parts of sand; 100 parts of stones; wherein the cement and ore powder are gels, the weight ratio of water to the gels is 0.30, and the mass ratio of the water reducing agent to the gels is 1.8:100.

In Embodiment 9, raw materials of the tubular pile are prepared according to parts by weight as follows: 100 parts of water; 315 parts of cement; 135 parts of ore powder; 605 parts of sand; and 9.5 parts of water reducing agent.

In the above embodiments, the required parameters of the raw materials are: The cement has a grade of 525, a specific surface area of greater than 330 m2/kg, 3-day compressive strength of not less than 32 Mpa, and 28-day compressive strength of not less than 61 Mpa. The particle size of the stone is 5~25 mm, the mud content of the stone is not more than 1%, and the stone crushing index is less than 8. the fineness modulus of the sand is 2.6~3.0, and the clay content does not exceed 0.9%; the concrete water reducing rate of the water reducing agent is not less than 25%; the seven-day activity index of the ore powder is not less than 95, and the 28-day activity index is not less than 105. Each embodiment includes three parallel groups.

Raw materials of each above group is made into a tubular pile with the following method:

1. putting the raw materials into a forced mixer according to the proportions, and mixing them for 2~3 minutes to make the slump of the concrete reach 3~5 cm;

2. putting the mixed concrete into a mold mounted with a reinforcement cage skeleton by a distributing device, and carrying out pre-stress stretch after completion of the distribution, the tensile force is 78%~82% of the total strength of the pre-stress reinforcement;

3. sealing the mold after four stages of standing, low speed centrifugation, mid-speed centrifugation and high speed centrifugation until the tubular pile molding; during processes of the centrifugation, rotating speed of the low speed centrifugation is 75~80 r/min and the time thereof is 2~3 minutes, rotating speed of the mid-speed centrifugation is 220~240 r/min and the time thereof is 1~2 minutes, and rotating speed of the high-speed centrifugation is 480~550 r/min and the time thereof is 4~6 minutes.

4. carrying out steam curing twice, with first entering into the conservation pool with the mold with a curing temperature of 85~90° C. and time of 3.5~4.5 hours and a stripping strength of not less than 55 Mpa; then carrying out demoulding curing by heating to 175~185° C. to make constant temperature and constant pressure curing with the pressure of 0.9~1 Mpa and curing time of 5.5~6.5 hours; and 5. uniformly reducing the temperature to room temperature after 2~3 hours, and pulling out and hoisting the concrete.

The tubular piles obtained in the embodiments of the present invention are tested according to GB/T50082-2009, including chloride diffusion coefficient detection, sodium sulfate solution for sulfate corrosion resistance testing, and performance testing of resistance to water penetration.

The experiment results show that the 28d chloride diffusion coefficient of the tubular piles obtained in the above embodiments is less than $3 \times 10^{-12}$ m2/S, the level of resistance to sulfate corrosion is higher than KS120, and the level of resistance to penetration reaches P12.

The inventor has also developed a preservative made of a mixture of 30-60 parts of ore powder, 5-15 parts of anhydrite, 25-40 parts of flyash, 1-8 parts of limestone, 5-20 parts of zeolite and 5-10 parts of cerium sulfate all of a specific surface area of more than 400 m2/kg, and the above parts all refer to parts by weight. The preservative is added in an amount of 1-15% of the total concrete material. This preservative composition having a high specific surface area, high silicon, high alumina and high activity, and having "micro-powder filling effect" with appropriate matching with the cement, can improve the concrete compactness of the concrete to improve the flexural and compressive strength, and can especially cover a layer of protective film of C—S—H gel on aluminate compounds susceptible to erosion, to achieve the effects of sea water corrosion resistance, chloride penetration resistance, and freeze protection.

Figure 2:
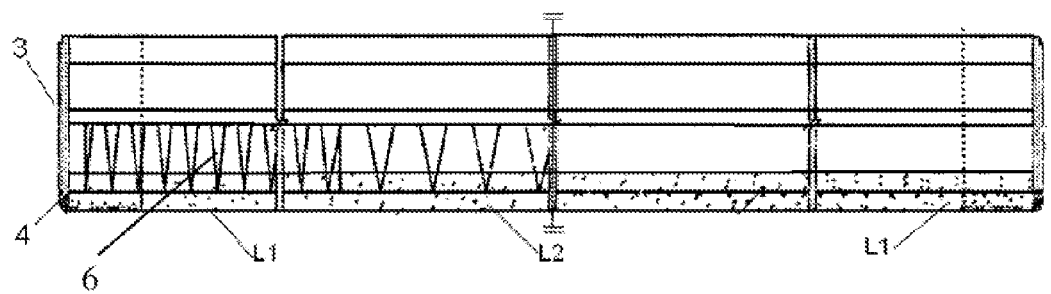
FIG. 2 is a longitudinal schematic diagram according to embodiments of the present invention.

FIG. 1 and FIG. 2 are respectively the lateral and longitudinal schematic diagrams according to of the present invention. The specific structure of the corrosion-resistant tubular pile according to the invention is hollow cylindrical square pile. FIG. 1 shows a cylindrical hollow pile of a wall thickness L of 90-130 mm and inner diameter D of 300-600 mm, and the number of pre-stress reinforcements 1 evenly distributed in the pile body is 8-12.

FIG. 2 is the longitudinal schematic diagram of a truncated pile of the present invention. As can be seen from the figure, an end plate 3 and shroud ring 4 are fixed to one end of the pile, and spiral hooping 2, which is a cold-drawn carbon steel wire of a diameter of greater than or equal to 5 mm, forms an encrypted area L1 and an unencrypted area L2 longitudinally.

What is claimed:

1. A pre-stress corrosion-resistant tubular pile used in special coastal geological conditions where the pile is subject to corrosion from exposure to salts, raw materials and proportions of the pre-stress corrosion-resistant tubular pile are as follows:

350-450 parts by weight of cement;
90-135 parts by weight of an ore powder;
600-700 parts by weight of sand;
100-120 parts by weight of stones;
water and a water reducing agent;
wherein the cement and ore powder are gels; the weight ratio of water to the gels is 0.30-0.31, and the mass ratio of the water reducing agent to the gels is (1.8-2.2):100.

2. The pre-stress corrosion-resistant tubular pile used in special coastal geological conditions according to claim 1, wherein the cement has a grade of 525, specific surface area of greater than 330 m$^2$/kg, 3-day compressive strength of not less than 32 Mpa, and 28-day compressive strength of not less than 61 Mpa.

3. The pre-stress corrosion-resistant tubular pile used in special coastal geological conditions according to claim 1, wherein particle size of the stones is 5-25 mm, mud content of the stone is not more than 1%, and the stone crushing index is less than 8.

4. The pre-stress corrosion-resistant tubular pile used in special coastal geological conditions according to claim 1, wherein fineness modulus of the sand is 2.6-3.0, and clay content thereof does not exceed 0.9%.

5. The pre-stress corrosion-resistant tubular pile used in special coastal geological conditions according to claim 1, wherein concrete water reducing rate of the water reducing agent is not less than 25%.

6. The pre-stress corrosion-resistant tubular pile used in special coastal geological conditions according to claim 1, wherein 7-day activity index of the ore powder is not less than 95, and 28-day activity index thereof is not less than 105.

7. The pre-stress corrosion-resistant tubular pile used in special coastal geological conditions according claim 1, wherein the weight ratio of the ore powder to the cement is 3:10.

8. A method for producing the pre-stress corrosion-resistant tubular pile used in special coastal geological conditions according to claim 1, comprising:
   (1) putting the raw materials into a forced mixer according to the proportions, and mixing for 2-3 minutes to make the slump of the concrete reach 3-5 cm;
   (2) putting the mixed concrete into a mold mounted with a reinforcement cage skeleton by a distributing device, and carrying out pre-stress stretch after completion of the distribution, the tensile force is 78%-82% of the total strength of the pre-stress reinforcement;
   (3) sealing the mold after four stages of standing, low speed centrifugation, mid-speed centrifugation and high speed centrifugation until the tubular pile molding;
   (4) carrying out steam curing twice, with first entering into a conservation pool with the mold with a curing temperature of 85-90° C. and time of 3.5-4.5 hours and a stripping strength of not less than 55 Mpa; then carrying out demoulding curing by heating to 175-185° C. to make constant temperature and constant pressure curing with the pressure of 0.9-1 Mpa and curing time of 5.5-6.5 hours; and
   (5) uniformly reducing the temperature to room temperature after 2-3 hours, and pulling out and hoisting the concrete from the mold.

9. The method for producing the pre-stress corrosion-resistant tubular pile used in special coastal geological conditions according to claim 8, characterized in that, during processes of the centrifugation, rotating speed of the low speed centrifugation is 75-80 r/min and the time thereof is 2-3 minutes, rotating speed of the mid-speed centrifugation is 220-240 r/min and the time thereof is 1-2 minutes, and rotating speed of the high speed centrifugation is 480-550 r/min and the time thereof is 4-6 minutes.

* * * * *